(12) United States Patent
Ebata et al.

(10) Patent No.: US 8,636,599 B2
(45) Date of Patent: Jan. 28, 2014

(54) TORQUE FLUCTUATION ABSORBER

(71) Applicants: Masaru Ebata, Chita (JP); Toshiya Yamashita, Toyota (JP); Takashi Hori, Anjo (JP); Yasunori Doman, Hirakata (JP)

(72) Inventors: Masaru Ebata, Chita (JP); Toshiya Yamashita, Toyota (JP); Takashi Hori, Anjo (JP); Yasunori Doman, Hirakata (JP)

(73) Assignees: Aisin Seiki Kabushiki Kaisha, Kariya-Shi, Aichi-Ken (JP); Aisin AW Co., Ltd., Anjo-Shi, Aichi-Ken (JP)

( * ) Notice: Subject to any disclaimer, the term of this patent is extended or adjusted under 35 U.S.C. 154(b) by 0 days.

(21) Appl. No.: 13/626,388

(22) Filed: Sep. 25, 2012

(65) Prior Publication Data
US 2013/0081512 A1    Apr. 4, 2013

(30) Foreign Application Priority Data

Sep. 29, 2011  (JP) ................................. 2011-214267
Sep. 29, 2011  (JP) ................................. 2011-214268

(51) Int. Cl.
*F16F 15/123*  (2006.01)

(52) U.S. Cl.
USPC ............................ 464/17; 464/68.1; 192/208

(58) Field of Classification Search
USPC .............. 464/7, 17, 68.1, 67.1, 68.3; 192/208
See application file for complete search history.

(56) References Cited

U.S. PATENT DOCUMENTS

| 4,187,390 | A | * | 2/1980 | Gore |
| 4,761,324 | A | * | 8/1988 | Rautenberg et al. |
| 4,856,636 | A | * | 8/1989 | Meinhard ................. 192/208 X |
| 5,160,007 | A | * | 11/1992 | Reik et al. |
| 5,601,492 | A | * | 2/1997 | Schierling et al. |
| 5,873,445 | A | | 2/1999 | Haberbusch et al. |
| 5,916,025 | A | | 6/1999 | Fenioux et al. |
| 6,014,912 | A | * | 1/2000 | Carlson ........................ 464/68.1 |
| 6,524,190 | B1 | * | 2/2003 | Strauss |
| 6,620,048 | B2 | | 9/2003 | Gillmann et al. |
| 7,766,752 | B2 | | 8/2010 | Sacki et al. |
| 7,927,219 | B2 | | 4/2011 | Sacki et al. |

FOREIGN PATENT DOCUMENTS

| EP | 0 960 292 B1 | 8/2003 |
| JP | 2007-218346 A | 8/2007 |
| JP | 2010-185493 A | 8/2010 |
| WO | WO 99/31405 A1 | 6/1999 |

* cited by examiner

*Primary Examiner* — Gregory Binda
*Assistant Examiner* — Josh Skroupa
(74) *Attorney, Agent, or Firm* — Buchanan Ingersoll & Rooney PC (57) ABSTRACT

A torque fluctuation absorber includes a center plate rotatably arranged, a side plate arranged coaxially with and rotatably relative to the center plate, an elastic member accommodated in a space surrounded by the side plate and absorbing torque fluctuations generated between the side plate and the center plate, a cover member separating the space and an outside space from each other by covering a clearance between the center plate and the side plate, and a vent portion arranged inwardly in a radial direction of the side plate relative to the cover member and providing a ventilation between the space and the outside space.

17 Claims, 4 Drawing Sheets

TORQUE FLUCTUATION ABSORBER

CROSS REFERENCE TO RELATED APPLICATIONS

This application is based on and claims priority under 35 U.S.C. §119 to Japanese Patent Application 2011-214267, filed on Sep. 29, 2011, and to Japanese Patent Application 2011-214268, filed on Sep. 29, 2011, the entire contents of which are incorporated herein by reference.

TECHNICAL FIELD

This disclosure relates to a torque fluctuation absorber.

BACKGROUND DISCUSSION

A torque fluctuation absorber is arranged on a power transmission path between an engine and a transmission, and absorbs (restricts) fluctuating torque generated between the engine and the transmission. The torque fluctuation absorber may include a damper portion for absorbing the fluctuating torque by means of an elastic force (a spring force). The damper portion includes two rotating members, and an elastic member (a coil spring) arranged between the two rotating members in a circumferential direction thereof so that the coil spring absorbs the fluctuating torque by contracting in a case where the two rotating members rotate relative to each other.

A device provided with the aforementioned damper portion may be structured in a manner that one of the rotating members is arranged at an outer periphery and/or at both sides of the other one of the rotating members, and a clearance between one of the rotating members and the other one of the rotating members is closed by means of a seal member. Thus, a space in which the coil spring is accommodated is sealed. The device provided with the aforementioned damper portion may be structured in a manner that one of the rotating members is rotatably supported at the other one of the rotating members via a bearing.

For example, according to EP0960292B1 (hereinafter referred to as Patent reference 1), a clearance between a damper plate and a cover is closed by means of a sealing joint fixed to the damper plate, and thus a space in which an elastic member is accommodated is sealed. In addition, according to Patent reference 1, a clearance between a mass and a flange is closed by means of a bearing, and thus the space in which the elastic member is accommodated is sealed.

According to U.S. Pat. No. 6,620,048 B2 (hereinafter referred to as Patent reference 2), a clearance between a side wall and an inner section is closed by means of an annular seal fixed to the side wall, and thus a chamber is sealed. A flywheel fixed to the inner section is rotatably supported via a ball bearing at a hub fixed to the side wall.

According to JP2007-218346A (hereinafter referred to as Patent reference 3), a space in which a damper member is accommodated is covered with a flywheel and with a cover member, and thus the space is sealed.

However, in a case where the space into which ingress of muddy water needs to be restricted (that is, the space in which the coil spring is accommodated) is sealed to be an air tightly-sealed closed space as is found in known torque fluctuation absorbers, a pressure difference between an internal gas (most thereof is air) and atmospheric air between an operation time and a down time may be caused by a temperature change of the internal gas. The pressure difference acts at a seal portion, at which rigidity is relatively low.

In a case where the seal portion does not resist the pressure difference, there may be the following drawbacks. When the internal pressure is negative, muddy water in a vicinity of the seal portion may possibly come into an inside of the air tightly-sealed closed space, and when the internal pressure is positive, for example, grease enclosed in the space and existing in a vicinity of the seal portion may possibly leak out to an outside of the space.

In addition, a specification is set so that the seal portion resists the pressure difference when the seal portion is new, however, the seal portion made of elastic material (rubber or resin material) may not maintain an initial configuration thereof due to creep and/or stress relaxation because a deformation caused by a pressing force is further added to a normal interference at the seal portion as the temperature increases/decreases. In other words, the seal portion incurs permanent deformation and may possibly not ensure a sealing performance.

In order to resolve the aforementioned drawbacks, adjustment of the interference of the seal portion may be considered. In a case where the interference of the seal portion is decreased, the robustness of the sealing performance (that is, a capability to restrict changes in the sealing performance) decreases. On the other hand, in a case where the interference of the seal portion is increased, hysteresis of damping characteristics increases and a damping performance decreases. In other words, according to the sealing structure of the known torque fluctuation absorbers, even in a case where the interference of the seal portion is adjusted, it is difficult to ensure the sealing performance and the damping performance due to the aforementioned tradeoff.

A need thus exists for a torque fluctuation absorber which is not susceptible to the drawback mentioned above.

SUMMARY

According to an aspect of this disclosure, a torque fluctuation absorber includes a center plate rotatably arranged, a side plate arranged coaxially with and rotatably relative to the center plate, an elastic member accommodated in a space surrounded by the side plate and absorbing torque fluctuations generated between the side plate and the center plate, a cover member separating the space and an outside space from each other by covering a clearance between the center plate and the side plate, and a vent portion arranged inwardly in a radial direction of the side plate relative to the cover member and providing a ventilation between the space and the outside space.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A torque fluctuation absorber 3 according to a first embodiment, includes a center plate 23 (refer to FIG. 3) rotatably arranged, a side plate 17, 18 (refer to FIG. 3) arranged coaxially with and rotatably relative to the center plate 23, an outer coil spring 34 and an inner coil spring 35 (refer to FIG. 3) accommodated in a space surrounded by the side plate 17, 18 and absorbing torque fluctuations generated between the side plate 17, 18 and the center plate 23, a cover member 25 (refer to FIG. 3) separating the space and an outside space, that is, an outside of the space surrounded by the side plate 17, 18, from each other by covering a clearance between the center plate 23 and the side plate 18, and a vent portion 17e (refer to FIG. 3), and a hole portion 17b and a water-resistant moisture-permeable material 60 (refer to FIG. 4) arranged inwardly in a radial direction of the side plate relative to the cover member 25 and providing a ventilation between the space and the outside space. The outer coil spring 34 and the inner coil spring 35 respectively serve as an elastic member. The vent portion 17e, the hole portion 17b and the water-resistant moisture-permeable material 60 serve as the vent portion.

In the embodiments disclosed here, reference numerals are for enhancing understanding and are not provided to intend to limit the embodiments to those illustrated in the drawings.

Figure 1:
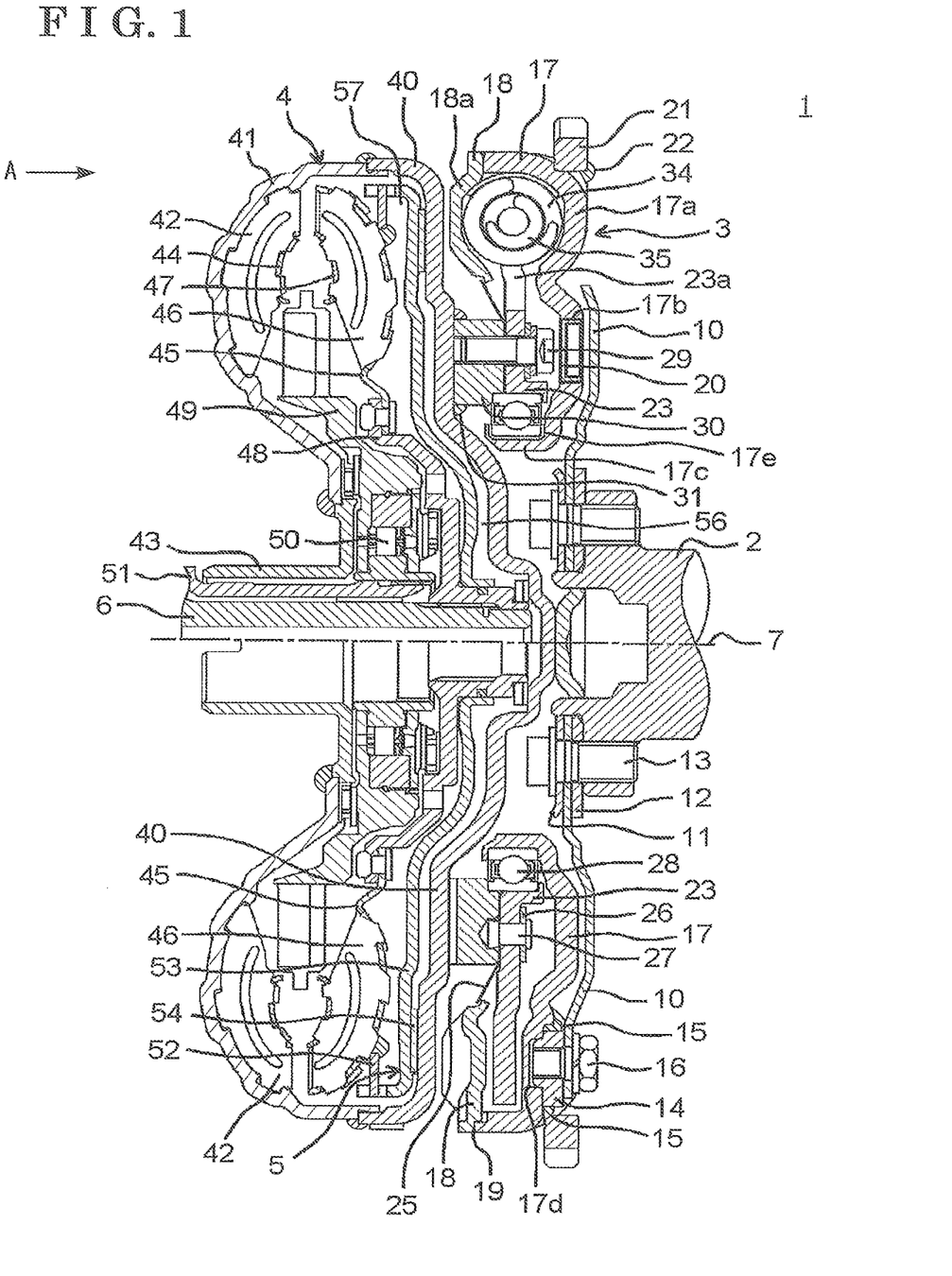
FIG. 1 is a cross-sectional view taken along line I-I in FIG. 2, which schematically illustrates a power transmission device including a torque fluctuation absorber according to a first embodiment disclosed here.

The torque fluctuation absorber 3 according to the first embodiment will be explained with reference to the drawings. As illustrated in FIG. 1, a power transmission device 1 is a device for transmitting rotative power of an engine (an internal combustion engine) to a transmission. At the power transmission device 1, the torque fluctuation absorber 3 and a torque converter 4 are arranged serially with each other on a power transmission path between a crankshaft 2 of the engine and an input shaft 6 of the transmission. The crankshaft 2 and the input shaft 6 are arranged coaxially with each other on a rotational axis 7.

Figure 2:
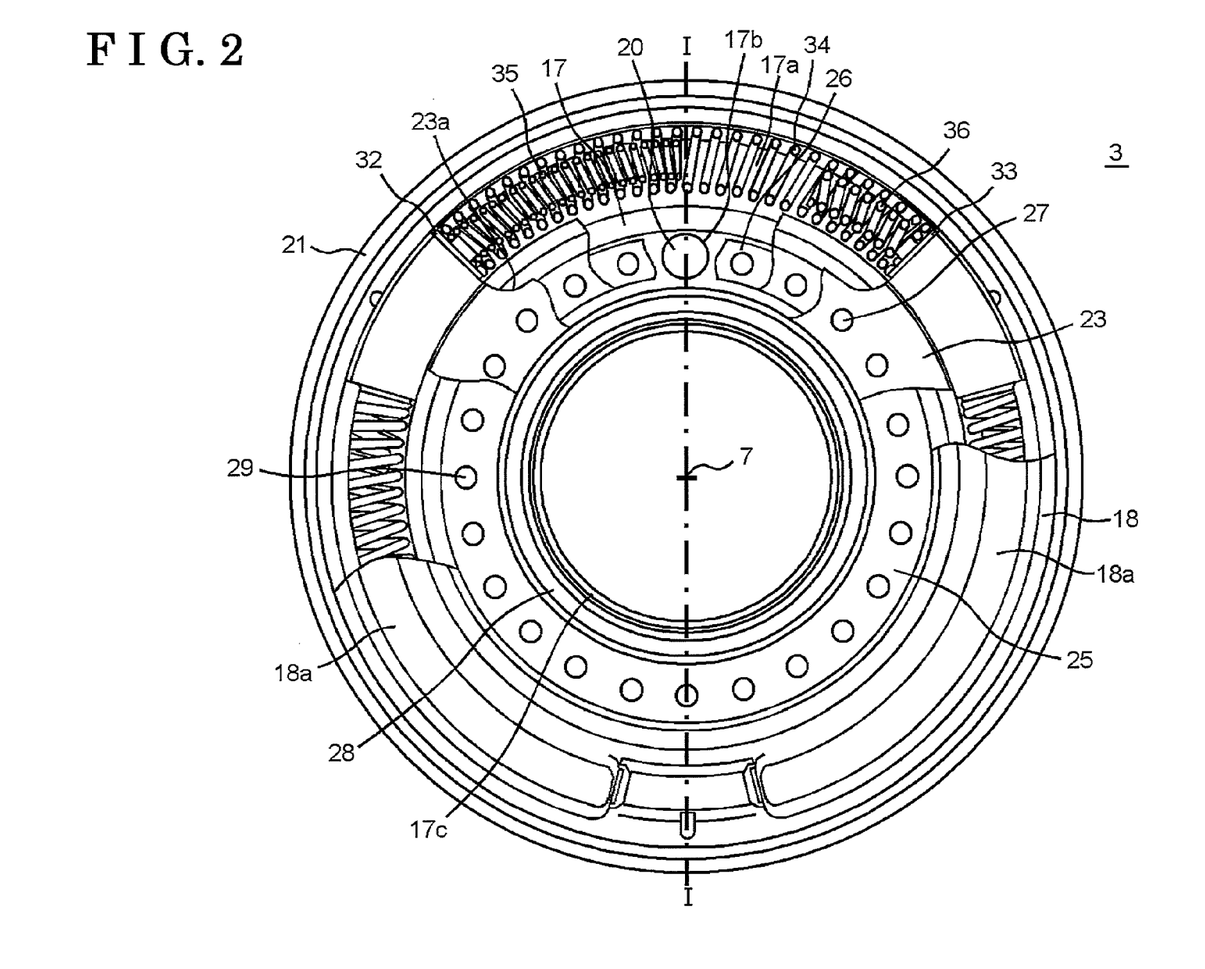
FIG. 2 is a plan view seen from a direction of an arrow A in FIG. 1, which schematically illustrates the torque fluctuation absorber according to the first embodiment.
Figure 3:
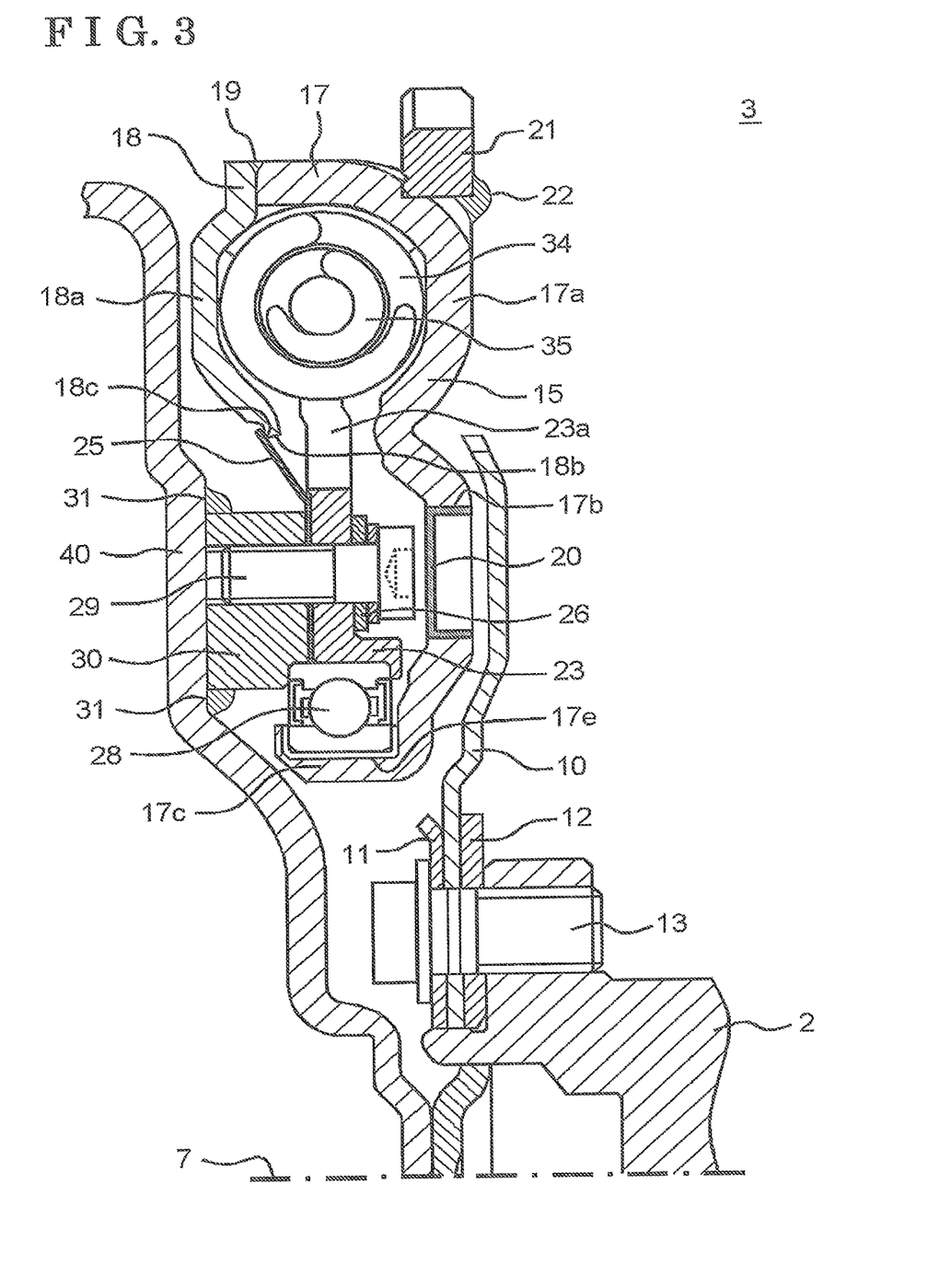
FIG. 3 is a partial enlarged view schematically illustrating the torque fluctuation absorber according to the first embodiment.

The torque fluctuation absorber 3 absorbs (restricts) fluctuating torque generated between the engine and the transmission (refer to FIGS. 1 to 3). The torque fluctuation absorber 3 is arranged on a power transmission path between the crankshaft 2 and the torque converter 4 (a front cover 40). The torque fluctuation absorber 3 includes a damper portion absorbing the fluctuation torque by means of an elastic force (a spring force). At the damper portion, the torque fluctuation absorber 3 absorbs the fluctuating torque generated between the side plate (an assembly constituted by the side plate 17, 18) and the center plate 23 by means of the coil springs 34, 35, 36. In addition, the torque fluctuation absorber 3 includes a structure where the center plate 23 is rotatably supported at the side plate 17, 18 via a bearing 28. The torque fluctuation absorber 3 is structured in a manner that, at the damper portion, the side plate (the assembly constituted by the side plates 17, 18) is arranged at an outer periphery and at both sides of the center plate 23 in a direction of the rotational axis 7 to seal a space in which the coil springs 34, 35, 36 are accommodated, a clearance between the side plate 17 and the center plate 23 is closed with the bearing 28, a clearance between the side plate 18 and the center plate 23 is closed with the cover member 25, and the hole portion 17b formed at the side plate 17 is closed with a cap 20. The torque fluctuation absorber 3 includes the vent portion, for example, the vent portion 17e illustrated in FIG. 3, for allowing ventilation between the space in which the coil springs 34, 35, 36 are accommodated and an outside, that is, the outside of the space in which the coil springs 34, 35, 36 are accommodated, in order to ensure a damping performance. An opening portion of the vent portion 17e is arranged radially inwardly relative to a position where the coil springs 34, 35, 36 are arranged (desirably, relative to a contact portion at which the cover member 25 and the side plate 18 are in contact with each other). The vent portion 17e is desirably positioned as close to the rotational axis 7 as possible. The vent portion 17e includes a structure where, for example, muddy water is not likely to come from the outside into the space in which the coil springs 34, 35, 36 are accommodated and, for example, grease is not likely to come out of the space, in which the coil springs 34, 35, 36 are accommodated, to the outside.

The torque fluctuation absorber 3 includes, as component members, a drive plate 10, side members 11, 12, a bolt 13, a block member 14, a welded portion 15, a bolt 16, the side plate 17, the side plate 18, a welded portion 19, the cap 20, a ring gear 21, a welded portion 22, the center plate 23, the cover member 25, a side member 26, a rivet 27, the bearing 28, a bolt 29, a block member 30, a welded portion 31, seat members 32, 33, the outer coil spring 34 and the inner coil springs 35, 36.

The drive plate 10 is a disc-shaped plate for inputting the rotative power from the crankshaft 2 to the torque fluctuation absorber 3 (refer to FIGS. 1 and 3). The drive plate 10 is fastened (connected) to the crankshaft 2 with the bolt 13 at plural positions in a state where the drive plate 10 is sandwiched by the side member 11 and the side member 12 at a radially inward portion of the drive plate 10. Accordingly, the drive plate 10 rotates integrally with the crankshaft 2. The drive plate 10 is fastened with the bolt 16, for example, plural bolts 16, to the corresponding block member 14 at a radially outward portion of the drive plate 10.

The side member 11 is an annular plate member for stabilizing a bearing surface of a bolt head of the bolt 13 and for enhancing durability of the drive plate 10 (refer to FIGS. 1 and 3). The side member 11 is arranged between the bolt head of the bolt 13 and the drive plate 10, and is fastened (connected) to the crankshaft 2 together with the drive plate 10 and the side member 12 by means of the bolt 13 at plural positions.

The side member 12 is an annular plate member for enhancing durability of the drive plate 10 against, for example, vibrations (refer to FIGS. 1 and 3). The side member 12 is arranged between the drive plate 10 and the crankshaft 2, and is fastened (connected) to the crankshaft 2 together with the drive plate 10 and the side member 11 by means of the bolt 13 at plural positions.

The bolt 13 is a member fastening (connecting) the drive plate 10 and the side members 11, 12 to the crankshaft 2 (refer to FIGS. 1 and 3).

The block member 14 is a block-shaped member to which the drive plate 10 is fastened by means of the bolt 16 (refer to FIG. 1). The block member 14 is attached to a recessed portion 17d formed at the side plate 17 at a portion between an accommodation portion 17a (that is, a portion in which the coil springs 34, 35, 36 are accommodated) and another accommodation portion 17a positioned next or adjacent thereto in a circumferential direction of the side plate 17. In other words, the block member 14 is arranged at a position that overlaps a position of the accommodation portion 17a in the circumferential direction. The block member 14 is, at radially inward and outward portions thereof, fixedly welded to the side plate 17 at the welded portions 15, 15, respectively. The block member 14 includes a female screw provided at a portion corresponding to the bolt 16 and threading with the bolt 16. The drive plate 10 is fastened (connected) to the block member 14 by means of the bolt 16, and thus the block member 14 rotates integrally with the drive plate 10 and the side plate 17.

The welded portion 15 is a portion at which the block member 14 is fixed to the side plate 17 by means of welding (refer to FIG. 1). At the welded portions 15, 15, the radially outward portion and the radially inward portion of the block member 14 are fixed to the side plate 17.

The bolt 16 is a member fastening (connecting) the drive plate 10 to the block member 14 (refer to FIG. 1).

The side plate 17 is an annular member (refer to FIGS. 1 to 3). The side plate 17 includes, at a radially inward portion thereof, a cylindrical portion 17c projecting in a direction of the front cover 40. An inner ring of the bearing 28 is attached (press-fitted, fixed in a caulked manner) at an outer peripheral surface of the cylindrical portion 17c and the side plate 17 rotatably supports the center plate 23 via the bearing 28. The side plate 17 includes the hole portion 17b for accepting therethrough the bolt 29. The cap 20 closing an entire hole portion 17b is mounted on the hole portion 17b. The side plate 17 includes at the radially outward portion thereof the accommodation portion 17a formed in a form of a bag for accommodating therein the seat members 32, 33 and the coil springs 34, 35, 36. The side plate 17 receives and supports the centrifugal force of the coil springs 34, 35, 36 and the seat members 32, 33, and a component force acting in a radial direction of the side plate 17 in a case where the coil is compressed. The accommodation portion 17a is configured to be in contact with and out of contact from the seat members 32, 33 at end surfaces of the accommodation portion 17a in the circumferential direction, respectively. In a case where a torsion is not generated between the side plate 17, 18 and the center plate 23, the accommodation portion 17a is in contact with the seat members 32, 33 or the accommodation portion 17a is positioned close to the seat members 32, 33 while allowing a play between the accommodation portion 17a and the seat members 32, 33. In a case where the torsion is generated between the side plate 17, 18 and the center plate 23, the accommodation portion 17a is in contact with one of the seat member 32 and the seat member 33. The side plate 17 includes the recessed portion 17d formed at a surface, which faces in a direction of the drive plate 10, of the side plate 17, in a manner that the recessed portion 17d is arranged between the adjacent accommodation portions 17a, 17a in the circumferential direction. The recessed portion 17d is a portion at which the block member 14 is attached. The recessed portion 17d may be formed by means of cutting and/or press-molding. The block member 14, which is attached to the recessed portion 17d, is fixed to the side plate 17 at the welded portion 15. The side plate 17 is formed so as to cover a radially outer side of the outer coil spring 34. The side plate 17, at an outer peripheral surface thereof, is inserted inside the ring gear 21 shaped in an annular shape and the ring gear 21 is fixed to the side plate 17 at the welded portion 22. An end portion of the side plate 17, which faces in a direction of the torque converter 4, is in close contact with the side plate 18 along an entire circumference of the side plate 17, and the side plate 17 is fixed to the side plate 18 at the welded portion 19.

The side plate 17 includes the vent portion 17e providing the ventilation between the space in which the coil springs 34, 35, 36 are accommodated and the outside. The vent portion 17e serves as an atmospheric air open hole (a breather hole) of the space in which the coil springs 34, 35, 36 are accommodated. The vent portion 17e is a groove portion (a recessed portion may be applicable) provided at the outer peripheral surface of the cylindrical portion 17c and is formed in a shape corresponding to an outer shape of the bearing 28. The opening portion of the vent portion 17e is arranged radially inwardly relative to the position where the coil springs 34, 35, 36 are arranged (desirably, relative to the contact portion at which the cover member 25 and the side plate 18 are in contact with each other). The opening portion of the vent portion 17e includes an outer-side opening portion and an inner-side opening portion. The outer-side opening portion of the vent portion 17e (that is, the opening portion opening to the outside space) desirably faces radially outwardly so that ingress of, for example, the muddy water is restricted when the torque fluctuation absorber 3 is rotating and/or so that, even in a case where the muddy water or the like comes in the vent portion 17e, the muddy water is facilitated to be easily discharged to the outside. The inner-side opening portion of the vent portion 17e (that is, the opening portion positioned in a vicinity of the space in which the coil springs 34, 35, 36 are accommodated and opening thereto) desirably faces radially outwardly so that ingress of, for example, the grease, is restricted when the torque fluctuation absorber 3 is rotating and/or so that, even in a case where the grease or the like comes in the vent portion 17e, the grease is facilitated to easily go back into the space in which the coil springs 34, 35, 36 are accommodated. The vent portion 17e desirably includes a portion which is parallel with an axial direction of the side plate 17 and which is formed at an intermediate portion of the vent portion 17e between the outer-side opening portion and the inner-side opening portion. Accordingly, even in a case where, for example, the muddy water comes from the outside into the vent portion 17e, the muddy water or the like is restricted from coming into the space in which the coil springs 34, 35, 36 are accommodated. Further, even in a case where, for example, the grease comes from an inside of the space in which the coil springs 34, 35, 36 to the vent portion 17e, the grease or the like is restricted from being discharged to the outside. In FIG. 3, the vent portion 17e is provided at the side plate 17, however, the vent portion 17e may be provided at the inner ring (at an inner peripheral surface of the inner ring or end surfaces of the inner ring in the axial direction) of the bearing 28 or at the center plate 23.

The side plate 18 is an annular member (refer to FIGS. 1 to 3). The side plate 18 is arranged radially outwardly relative to the block member 30 formed in an annular shape, while leaving a predetermined distance between the side plate 18 and the block member 30. A radially outward portion of the side plate 18 is in close contact with the side plate 17 along the entire circumference of the side plate 18, and the side plate 18 is fixed to the side plate 17 at the welded portion 19. Accordingly, the side plate 18 rotates integrally with the side plate 17, and lubricant in the inside of the space in which the coil springs 34, 35, 36 are accommodated does not leak out from a joint portion between the side plate 17 and the side plate 18. The side plate 18 includes at an intermediate portion thereof an accommodation portion 18a formed in a form of a bag for accommodating therein the seat members 32, 33 and the coil springs 34, 35, 36. The accommodation portion 18a is configured to be in contact with and out of contact from the seat members 32, 33 at end surfaces in a circumferential direction of the accommodation portion 18a, respectively. In a case where a torsion is not generated between the side plate 17, 18 and the center plate 23, the accommodation portion 18a is in contact with the seat members 32, 33 or the accommodation portion 18a is positioned close to the seat members 32, 33 while allowing a play between the accommodation portion 18a and the seat members 32, 33. In a case where the torsion is generated between the side plate 17, 18 and the center plate 23, the accommodation portion 18a is in contact with one of the seat member 32 and the seat member 33. An inner peripheral end surface 18b of the side plate 18, which is positioned radially inwardly relative to the accommodation portion 18a, projects in a direction of the center plate 23 along the entire circumference of the side plate 18. The inner peripheral end surface 18b is in slidably pressure contact with the cover member 25 along the entire circumference of the side plate 18, at a contact portion 18c provided at a corner portion of the inner peripheral end surface 18b at a side away from the center plate 23 (that is, the side positioned in a vicinity of the front cover 40). Accordingly, the space in which the coil springs 34, 35, 36 are accommodated is covered from the outside.

The welded portion 19 is a portion at which the side plate 17 and the side plate 18 are fixedly welded with each other (refer to FIGS. 1 and 3).

The cap 20 is a member closing the entire hole portion 17b of the side plate 17 and is mounted on the hole portion 17b (refer to FIGS. 1 to 3).

The ring gear 21 is a ring-shaped gear including a gear portion formed at an outer peripheral surface thereof (refer to FIGS. 1 to 3). The ring gear 21 engages with an output gear of a starter motor. The ring gear 21 is attached to an outer peripheral portion of the side plate 17 and is fixed to the side plate 17 at the welded portion 22.

The welded portion 22 is a portion at which the ring gear 21 is fixed to the side plate 17 by means of welding (refer to FIGS. 1 and 3).

The center plate 23 is an annular member (refer to FIGS. 1 to 3). The center plate 23 is arranged at an outer periphery of the cylindrical portion 17c of the side plate 17. The center plate 23 is, at an inner peripheral end portion thereof, rotatably supported at the cylindrical portion 17c of the side plate 17 via the bearing 28. The center plate 23 is arranged radially inwardly relative to the joint portion between the side plate 17 and the side plate 18, while leaving a predetermined distance between the joint portion and the center plate 23. The cover member 25 and the side member 26, which are respectively arranged at the both sides of the center plate 23 in the direction of the rotational axis 7, are fixed to a radially inward portion of the center plate 23 by means of the rivet 27 at plural positions. Accordingly, the center plate 23 rotates integrally with the cover member 25. The center plate 23 is fastened to the block member 30 together with the cover member 25 and the side member 26 by means of the bolt 29. Accordingly, the center plate 23 rotates integrally with the front cover 40 of the torque converter 4 via the block member 30. The center plate 23 includes, at an outer peripheral portion thereof, a window portion 23a defined by a cut-out portion for accommodating therein the seat members 32, 33 and the coil springs 34, 35, 36. The window portion 23a is configured to be in contact with and out of contact from the seat members 32, 33 at end surfaces of the window portion 23a in the circumferential direction, respectively. In a case where the torsion is not generated between the side plate 17, 18 and the center plate 23, the window portion 23a is in contact with the seat members 32, 33. In a case where the torsion is generated between the side plate 17, 18 and the center plate 23, the window portion 23a is in contact with one of the seat member 32 and the seat member 33.

The cover member 25 is an annular plate member (refer to FIGS. 1 to 3). The cover member 25 is, at a radially inward portion thereof, sandwiched between the center plate 23 and the block member 30. The cover member 25 is fixedly riveted to the center plate 23 together with the side member 26 by means of the rivet 27, and is fastened to the block member 30 together with the center plate 23 and the side member 26 by means of the bolt 29. At a radially outward portion of the cover member 25, the cover member 25 is positioned away from the center plate 23, and is in slidably pressure contact with the contact portion 18c provided at the corner portion of the inner peripheral end surface 18b of the side plate 18, the corner portion which is positioned away from the center plate 23. In other words, a surface, which faces in a direction of the center plate 23, of the cover member 25 is slidably pressure contact with the contact portion 18c from an outer side of the side plate 18 (that is, the side of the side plate 18 which faces in a direction of the front cover 40). Accordingly, the space in which the coil springs 34, 35, 36 are accommodated is covered from the outside. As the cover member 25, a thin plate having an elastic force, including but not limited to, a steel plate or resin may be used. Accordingly, costs are reduced.

The side member 26 is an annular plate member (refer to FIGS. 1 to 3). The side member 26 is fixedly riveted to the center plate 23 together with the cover member 25 by means of the rivet 27, and is fastened to the block member 30 together with the center plate 23 and the cover member 25 by means of the bolt 29.

The rivet 27 is a member fixedly riveting the cover member 25 and the side member 26 to the center plate 23 (refer to FIGS. 1 and 2).

The bearing 28 allows the center plate 23 to be rotatable relative to the side plate 17 (refer to FIGS. 1 to 3). The inner ring of the bearing 28 is fixed to the outer peripheral surface of the cylindrical portion 17c of the side plate 17 and an outer ring of the bearing 28 is fixed to the inner peripheral end portion of the center plate 23. The bearing 28 is a sealed-type and the grease is enclosed therein. A seal plate which is made of steel and to which synthetic rubber is adhered is fixed to the outer ring of the bearing 28, and a lip portion of an edge portion of the seal plate is slidably in contact with the inner ring of the bearing 28, and thus the grease is tightly sealed.

The bolt 29 is a member fastening the center plate 23, the cover member 25 and the side member 26 to the block member 30 (refer to FIGS. 1 to 3).

The block member 30 is a block-shaped annular member to which the center plate 23 is fastened by means of the bolt 29 (refer to FIGS. 1 and 3). The block member 30 is, at a radially outward portion thereof and at a radially inward portion thereof, fixedly welded to the front cover 40 of the torque converter 4 at the welded portions 31, 31. The block member 30 includes a female screw portion provided at a portion corresponding to the bolt 29 and threading with the bolt 29. The center plate 23, the cover member 25 and the side member 26 are fastened (connected) to the block member 30, and thus the block member 30 rotates integrally with the center plate 23 and the front cover 40.

The welded portion 31 is a portion at which the block member 30 is fixed to the front cover 40 of the torque converter 4 (refer to FIGS. 1 and 3). At the welded portions 31, 31, a radially outward portion and a radially inward portion of the block member 30 are fixed to the front cover 40.

The seat member 32 is a member which is accommodated in the accommodation portions 17a, 18a of the side plates 17, 18 and in the window portion 23a of the center plate 23. The seat member 32 is arranged between a first end surface of the accommodation portions 17a, 18a and of the window portion 23a, and a first end portion of the outer coil spring 34 in the circumferential direction (refer to FIG. 2). In order to reduce abrasion of the outer coil spring 34, the seat member 32 may be made of resin. The seat member 32 includes a portion press-fitted in an inside of a first end portion of the inner coil spring 35 arranged inside the outer coil spring 34 so that the first end portion of the inner coil spring 35 is secured by means of press-fitting.

The seat member 33 is a member which is accommodated in the accommodation portions 17a, 18a of the side plates 17, 18 and in the window portion 23a of the center plate 23. The seat member 33 is arranged between a second end surface of the accommodation portions 17a, 18a and of the window portion 23a, and a second end portion of the outer coil spring 34 in the circumferential direction (refer to FIG. 2). In order to reduce the abrasion of the outer coil spring 34, the seat member 33 may be made of resin. The seat member 33 includes a portion press-fitted in an inside of a second end portion of the inner coil spring 36 arranged inside the outer coil spring 34 so that the second end portion of the inner coil spring 36 is secured by means of press-fitting.

The outer coil spring 34 is accommodated in the accommodation portions 17a, 18a of the side plates 17, 18 and in the window portion 23a of the center plate 23, and is in contact with the seat members 32, 33 arranged respectively at end portions of the outer coil spring 34 (refer to FIGS. 1 to 3). The outer coil spring 34 is compressed in a case where the torsion is generated between the side plate 17, 18 and the center plate 23. At the inside of the outer coil spring 34, the inner coil spring 35 is arranged in a vicinity of the seat member 32 in the circumferential direction, and the inner coil spring 36 is arranged in a vicinity of the seat member 33 in the circumferential direction. In a case where the torsion is generated between the side plate 17, 18 and the center plate 23, the outer coil spring 34 is compressed to a substantially minimum length thereof before the inner coil spring 35 and the inner coil spring 36 come in close contact with each other. In a case where the torsion is generated between the side plate 17, 18 and the center plate 23, and when the outer coil spring 34 is compressed to the substantially minimum length thereof, the outer coil spring 34 serves as a stopper restricting the torsion between the side plate 17, 18 and the center plate 23. The outer coil spring 34 is set to have a spring constant that is smaller than those of the inner coil springs 35, 36. In a case where the torsion is generated between the side plate 17, 18 and the center plate 23, the outer coil spring 34 is compressed to the substantially minimum length thereof after the inner coil spring 35 is compressed to the substantially minimum length thereof.

The inner coil spring 35 is arranged at the inside of the outer coil spring 34 to be positioned in a vicinity of the seat member 32 in the circumferential direction (refer to FIGS. 1 to 3). The first end portion of the inner coil spring 35 is fixed to the seat member 32 in a manner that a portion of the seat member 32 is press-fitted in an inside of the first end portion of the inner coil spring 35, and thus the inner coil spring 35 is secured to the seat member 32. In a case where the torsion is not generated between the side plate 17, 18 and the center plate 23, a second end portion of the inner coil spring 35 is positioned away from a first end portion of the inner coil spring 36. In a case where the torsion is generated between the side plate 17, 18 and the center plate 23, and a torsional angle reaches a predetermined torsional angle, the second end portion of the inner coil spring 35 is in contact with the first end portion of the inner coil spring 36. In a case where the torsion is further generated relative to the predetermined torsional angle, the inner coil spring 35 is compressed. The spring constant of the inner coil spring 35 is set to be greater than that of the outer coil spring 34, and to be smaller than that of the inner coil spring 36. In a case where the torsion is generated between the side plate 17, 18 and the center plate 23, the inner coil spring 35 is compressed to the substantially minimum length thereof before the outer coil spring 34 is compressed to the substantially minimum length thereof.

The inner coil spring 36 is arranged at the inside of the outer coil spring 34 to be positioned in a vicinity of the seat member 33 in the circumferential direction (refer to FIG. 2). The second end portion of the inner coil spring 36 is fixed to the seat member 33 in a manner that a portion of the seat member 33 is press-fitted in an inside of the second end portion of the inner coil spring 36, and thus the inner coil spring 36 is secured to the seat member 33. In a case where the torsion is not generated between the side plate 17, 18 and the center plate 23, the first end portion of the inner coil spring 36 is positioned away from the second end portion of the inner coil spring 35. In a case where the torsion is generated between the side plate 17, 18 and the center plate 23, and the torsional angle reaches the predetermined torsional angle, the first end portion of the inner coil spring 36 is in contact with the second end portion of the inner coil spring 35. In a case where the torsion is generated further than the predetermined torsional angle, the inner coil spring 36 is compressed. The spring constant of the inner coil spring 36 is set to be greater than those of the outer coil spring 34 and the inner coil spring 35. In a case where the torsion is generated between the side plate 17, 18 and the center plate 23, the inner coil spring 36 is not compressed to the substantially minimum length thereof until the outer coil spring 34 is compressed to the substantially minimum length thereof.

The torque converter 4 is a hydraulic power transmission for generating amplification of the torque due to a rotational difference between a pump impeller 42 (for example, plural pump impellers 42), which is an input side, and a turbine runner 46 (for example, plural turbine runners 46), which is an output side by using a dynamic effect of fluid in a fluid working chamber (refer to FIG. 1). The torque converter 4 is arranged on a power transmission path between the torque fluctuation absorber 3 and the input shaft 6. The torque converter 4 includes a lock-up clutch 5 of a single-disc type. In a case where a difference in the number of rotations between the pump impeller 42 and the turbine runner 46 is small, the lock-up clutch 5 allows the pump impeller 42 and the turbine runner 46 to be directly connected with each other, and eliminates a difference in the number of rotations between the crankshaft 2 and the input shaft 6. The torque converter 4 includes, as component parts, the front cover 40, a pump shell 41, the pump impeller 42, a shaft 43, a pump core 44, a turbine shell 45, the turbine runner 46, a turbine core 47, a turbine hub 48, a stator 49, a one-way clutch 50, a shaft 51, a plate member 52, the lock-up piston 53 and a friction material 54.

The front cover 40 is a disc-shaped member arranged at an engine side (that is, on the right side in FIG. 1) relative to the torque converter 4 (refer to FIG. 1). The front cover 40 is formed to extend from the rotational axis 7 radially outwardly, and an outer peripheral portion of the front cover 40 extends in a direction of the transmission (that is, the left side in FIG. 1). An outer peripheral end portion of the front cover 40 is fixed to an outer peripheral end portion of the pump shell 41 by means of welding. The front cover 40 rotates integrally with the pump shell 41. In a space surrounded by the front cover 40 and the pump shell 41, component parts of the torque converter 4, including, for example, the pump impeller 42 and the turbine runner 46 are arranged, and automatic transmission fluid (ATF) serving as a working fluid is enclosed. The rotative power from the engine is inputted to the front cover 40 via the crankshaft 2 and the torque fluctuation absorber 3. The block member 30 of the torque fluctuation absorber 3 is welded to a surface, which faces in a direction of the engine (that is, on the right side in FIG. 1), of the front cover 40 at the welded portion 31. The front cover 40, at a surface thereof which faces in a direction of the transmission (that is, on the left side in FIG. 1, is engageable with the friction material 54 of the lock-up clutch 5).

The pump shell 41 is an annular member defining the space in which the ATF circulates (refer to FIG. 1). The outer peripheral end portion of the pump shell 41 is welded to the outer peripheral end portion of the front cover 40 and an inner peripheral end portion of the pump shell 41 is welded to the shaft 43. The pump shell 41 rotates integrally with the front cover 40 and the shaft 43. The plural pump impellers 42 are attached to a surface (an inner surface), which faces in a direction of the engine (that is, on the right side in FIG. 1), of the pump shell 41, and thus the pump shell 41 rotates integrally with the plural pump impellers 42.

The pump impeller 42 is a blade member of a pump side (refer to FIG. 1). Each pump impeller 42 is arranged so as to face the turbine runner 46. Relative to a center of the torque converter 4 in the axial direction thereof, an outer side end portion of the pump impeller 42 is attached to the pump shell 41 and an inner side end portion of the pump impeller 42 is attached to the pump core 44. The pump impeller 42 rotates integrally with the pump shell 41 and the pump core 44. The pump impeller 42 includes a configuration where the pump impeller 42 pushes the ATF, which flows from the stator 49, toward a direction of the turbine runner 46 in a case where the pump shell 41 rotates in one direction.

The shaft 43 is a shaft member formed in a hollow-cylindrical shape (refer to FIG. 1) and is rotatably supported at a case that covers the torque converter 4 and an outer periphery and/or a portion, which is in a vicinity of the transmission, of the torque fluctuation absorber 3. The shaft 43 is welded to the inner peripheral end portion of the pump shell 41, and thus rotates integrally with the pump shell 41. The shaft 43 is arranged at an outer periphery of the shaft 51 leaving a predetermined distance therebetween.

The pump core 44 is an annular member to which the inner side end portion of each of the plural pump impellers 42 is attached (refer to FIG. 1).

The turbine shell 45 is an annular member defining the space in which the ATF circulates (refer to FIG. 1). The turbine shell 45 is, at an inner peripheral portion thereof, fixed to the turbine hub 48 by means of plural rivets. The turbine shell 45 rotates integrally with the turbine hub 48. The plural turbine runners 46 are attached to a surface (an inner surface), which faces in a direction of the transmission (that is, on the left side in FIG. 1), of the turbine shell 45, and the turbine shell 45 rotates integrally with the plural turbine runners 46. The plate member 52 is fixed to the turbine shell 45 at a surface (an outer surface), which faces in a direction of the engine (that is, on the right side in FIG. 1), of the turbine shell 45 by means of welding.

The turbine runner 46 is a blade member of a turbine side (refer to FIG. 1). The turbine runner 46 is arranged so as to face the pump impeller 42. Relative to the center of the torque converter 4 in the axial direction thereof, an outer side end portion of the turbine runner 46 is attached to the turbine shell 45 and an inner side end portion of the turbine runner 46 is attached to the turbine core 47. The turbine runner 46 rotates integrally with the turbine shell 45 and the turbine core 47. The turbine runner 46 includes a configuration where the turbine runner 46 receives the ATF, which is pushed out by the pump impeller 42 as the pump impeller 42 rotates, and the turbine runner 46 discharges the ATF toward the stator 49. The turbine runner 46 is rotatable relative to the pump impeller 42 independent from the pump impeller 42.

The turbine core 47 is an annular member to which the inner side end portion of each of the plural turbine runners 46 is attached (refer to FIG. 1).

The turbine hub 48 is a member including a flange portion extending radially outwardly from a hub portion formed in a hollow-cylindrical shape (refer to FIG. 1). The turbine shell 45 is fixed to an outer peripheral portion of the flange portion of the turbine hub 48 by means of the plural rivets. The turbine hub 48 is, at an inner side of the hub portion thereof, splined to and engages with the input shaft 6 of the transmission so as to be movable in the axial direction but so as not to be rotatable. The turbine hub 48 rotates integrally with the turbine shell 45 and the input shaft 6. A cylinder portion of an inner peripheral portion of the lock-up piston 53 is arranged at an outer peripheral surface of the hub portion of the turbine hub 48 in a slidable manner in the axial direction. A sliding surface between the turbine hub 48 and the lock-up piston 53 is sealed.

The stator 49 is a member including plural blades for rectifying flow of the ATF flowing from the turbine runner 46 back to the pump impeller 42 (refer to FIG. 1). The stator 49 is arranged between the pump impeller 42 and the turbine runner 46 to be positioned closer to radially inward portion. The stator 49 acts so that a direction of the flow of the ATF from the turbine runner 46 back to the pump impeller 42 is changed. The stator 49 is attached to the case of the transmission via the one-way clutch 50 and the shaft 51, and is rotatable in one direction.

The one-way clutch 50 is a clutch rotatable in one direction (refer to FIG. 1). As the one-way clutch 50, a structure employing, for example, a roller mechanism, a sprag mechanism or a ratchet mechanism may be used. The one-way clutch 50 is arranged between the shaft 43 and the turbine hub 48 in the axial direction, and is arranged between the stator 49 and the shaft 51 in the radial direction. An outer ring of the one-way clutch 50 is fixed to the stator 49, and an inner ring of the one-way clutch 50 is splined to and engages with the shaft 51 so as to be movable in the axial direction but so as not to be rotatable.

The shaft 51 is a shaft member formed in a hollow-cylindrical shape and is attached to the case of the transmission so as not to be rotatable (refer to FIG. 1). The shaft 51 is splined to and engages with the inner ring of the one-way clutch 50 so as to be movable in the axial direction but so as not to be rotatable. The shaft 51 is arranged at an inner side of the shaft 43 formed in the hollow-cylindrical shape while leaving a predetermined distance between the shaft 51 and the shaft 43. The shaft 51 is arranged at an outer periphery of the input shaft 6 of the transmission and rotatably supports the input shaft 6 via a bush.

The plate member 52 is an annular member fixed at an outer surface of the turbine shell 45 by means of welding (refer to FIG. 1). The plate member 52 is splined to and engaged with the lock-up piston 53 so as to be movable in the axial direction but not so as to be rotatable. The plate member 52 rotates integrally with the turbine shell 45 and the lock-up piston 53.

The lock-up piston 53 is a piston formed in an annular shape for directly connecting the pump impeller 42 and the turbine runner 46 to each other in a case where the difference in the number of rotations between the pump impeller 42 and the turbine runner 46 is small (refer to FIG. 1). The lock-up piston 53 is arranged between an oil chamber 56 and an oil chamber 57 which are defined in a space surrounded by the front cover 40 and the pump shell 41. The oil chamber 56 is arranged between the lock-up piston 53 and the front cover 40, and the oil chamber 57 is arranged between the lock-up piston 53 and the pump shell 41. The friction material 54 formed in an annular shape is fixed to a surface, which faces in a direction of the front cover 40, of the lock-up piston 53 at a radially outward portion of the lock-up piston 53, and the lock-up piston 53 rotates integrally with the friction material 54. In a case where the friction material 54 frictionally engages with the front cover 40, the lock-up piston 53 rotates integrally with the crankshaft 2 via the friction material 54, the front cover 40, and the torque fluctuation absorber 3. The lock-up piston 53 is, at an outer peripheral end portion thereof, splined to and engages with the plate member 52 so as to be movable in the axial direction but so as not to be rotatable. The lock-up piston 53 rotates integrally with the input shaft 6 of the transmission via the plate member 52, the turbine shell 45 and the turbine hub 48. The lock-up piston 53 is arranged so as to be slidable in the axial direction relative to the outer peripheral surface of the hollow cylindrical-shaped hub portion of the turbine hub 48, and is sealed at a sliding surface between the lock-up piston 53 and the turbine hub 48. The lock-up piston 53 is pushed in a direction of the front cover 40 in a case where a hydraulic pressure in the oil chamber 56 is lower than a hydraulic pressure in the oil chamber 57, and thus the friction material 54 and the front cover 40 frictionally engage with each other. The lock-up piston 53 moves to be away from the front cover 40 in a case where the hydraulic pressure in the oil chamber 56 is higher than the hydraulic pressure in the oil chamber 57, and thus the frictional engagement between the friction material 54 and the front cover 40 is released. The hydraulic pressure in each of the oil chambers 56, 57 is controlled by a hydraulic circuit, so that a lock-up condition (that is, a state where there is no difference in the number of rotations between the crankshaft 2 and the input shaft 6) is established by controlling the hydraulic pressure in the oil chamber 56 to be lower than that in the oil chamber 57, and the lock-up condition is released by controlling the hydraulic pressure in the oil chamber 56 to be higher than that in the oil chamber 57.

The friction material 54 is an annular member fixed to the lock-up piston 53 (alternatively, the friction material 54 may be fixed to the front cover 40) and is frictionally engageable with the front cover 40 (refer to FIG. 1).

According to the torque fluctuation absorber 3 of the first embodiment, the vent portion 17e is provided between the space in which the coil springs 34, 35, 36 are accommodated and the outside space, and thus thermal expansion (or thermal contraction) of an internal gas caused by a temperature change is released, which restricts generation of a difference in pressure between an inside and an outside relative to the cover member 25, that is, between the space in which the coil springs 34, 35, 36 are accommodated and the outside space. Accordingly, suction of, for example, the muddy water and/or leakage of, for example, the grease is restricted. In addition, by providing the vent portion 17e, the difference in the pressure that occurs due to the rapid cooling is reduced in a short period of time.

Further, according to the torque fluctuation absorber 3 of the first embodiment, because the vent portion 17e is provided at a radially inner side, it is restricted that, for example, the muddy water is sucked from the vent portion 17e. The space in which the coil springs 34, 35, 36 are accommodated, which serves as the dumper portion, is rapidly cooled down upon ingress of, for example, the muddy water. The muddy water or the like ingresses from the radially outer side. Thus, by providing the vent portion 17e at the radially inner side, temperatures of the component parts of the damper portion and of the internal gas may be appropriately lowered by the time, for example, the muddy water reaches the vent portion 17e.

Further, according to the torque fluctuation absorber 3 of the first embodiment, the opening portion of the vent portion 17e faces radially outwardly. Accordingly, for example, the muddy water is discharged to the outside space by the centrifugal force even in a case where the muddy water comes in the vent portion 17e, and, for example, the grease is discharged by the centrifugal force back into the space in which the coil springs 34, 35, 36 are accommodated even in a case where the grease comes in the vent portion 17e.

Figure 4:
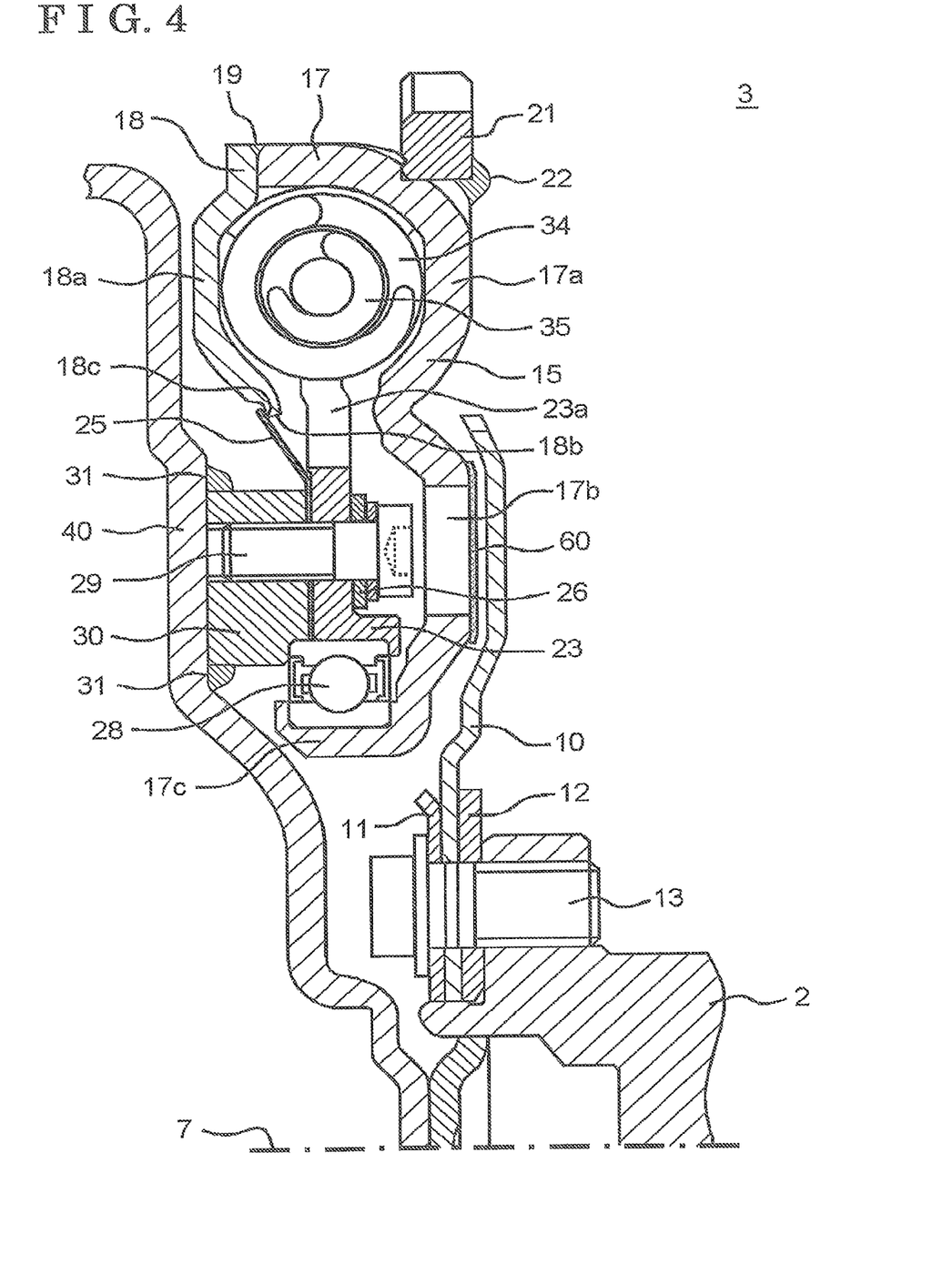
FIG. 4 is a partial enlarged view schematically illustrating a torque fluctuation absorber according to a second embodiment disclosed here.

The torque fluctuation absorber 3 according to a second embodiment will be explained with reference to the drawing.

In the second embodiment, which is a modification of the first embodiment, the vent portion (the vent portion 17e in FIG. 3) formed in the shape of the groove is not provided at the outer peripheral surface of the cylindrical portion 17c of the side plate 17. In the second embodiment, the cap (the cap 20 in FIG. 3) closing the hole portion 17b formed at the side plate 17 is not provided, and the hole portion 17b is used as the vent portion and is covered with the water-resistant moisture-permeable material 60. The water-resistant moisture-permeable material 60 is a sheet material, and has functions for preventing the ingress of, for example, the muddy water from the outside space and for allowing moisture and/or gasses in the inside (that is, the inside of the space in which the coil springs 34, 35, 36 are accommodated) to pass therethrough and to be discharged. As the water-resistant moisture-permeable material 60, for example, GORE-TEX (registered trademark) may be used. Because the hole portion 17b is covered by means of the water-resistant moisture-permeable material 60, a structure is established where it is difficult for the muddy water or the like to ingress from the outside space into the space in which the coil springs 34, 35, 36 are accommodated, and it is difficult for the grease or the like to come out of the space in which the coil springs 34, 35, 36 to the outside space. The water-resistant moisture-permeable material 60 is affixed (adhered, fixed) to the side plate 17 in a manner that the hole portion 17b is closed from a side at which the outside space exists. That is, the water-resistant moisture-permeable material 60 is mounted externally on the hole portion 17b. The hole portion 17b serving as the vent portion is desirably arranged radially inwardly relative to the position at which the coil springs 34, 35, 36 are arranged (desirably, relative to the contact portion at which the cover member 25 and the side plate 18 are in contact with each other). Other structures of the second embodiment are identical to those of the first embodiment. The second embodiment may be applied together with the first embodiment.

According to the torque fluctuation absorber 3 of the second embodiment, the hole portion 17b serving as the vent portion is provided between the space in which the coil springs 34, 35, 36 are accommodated and the outside space, and the hole portion 17b is covered with the water-resistant moisture-permeable material 60. Thus, the thermal expansion (or the thermal contraction) of the internal gas caused by the temperature change is released, which restricts the generation of the difference in the pressure between the inside and the outside relative to the cover member 25, that is, between the space in which the coil springs 34, 35, 36 are accommodated and the outside space. Accordingly, the suction of, for example, the muddy water and/or the leakage of, for example, the grease is restricted. In addition, by providing the hole portion 17b, the difference in the pressure that occurs due to the rapid cooling is reduced in a short period of time.

According to the torque fluctuation absorber 3 of the second embodiment, the hole portion 17b is provided at the radially inner side and is covered with the water-resistant moisture-permeable material 60. Accordingly, it is restricted that, for example, the muddy water is sucked from the hole portion 17b. The space in which the coil springs 34, 35, 36 are accommodated, which serves as the dumper portion, is rapidly cooled down upon ingress of, for example, the muddy water. The muddy water or the like ingresses from the radially outer side. Thus, by providing the hole portion 17b at the radially inner side, the temperatures of the component parts of the damper portion and of the internal gas may be appropriately lowered by the time when, for example, the muddy water reaches the hole portion 17b. Even in a case where the muddy water or the like reaches the hole portion 17b, the water-resistant moisture-permeable material 60 restricts the ingress of, for example, the muddy water.

In addition, according to the second embodiment, the hole portion 17b is covered with the water-resistant moisture-permeable material 60, and thus a hole diameter of the hole portion 17b may be set to be large. Because the hole portion 17b is closed with the water-resistant moisture-permeable material 60, a waterproofing property enhances. In addition, because the water-resistant moisture-permeable material 60 has a moisture permeability, the moisture in the inside of the damper portion (that is, the space in which the coil springs 34, 35, 36 are accommodated) may be discharged to the outside space by utilizing the temperature change and a change in an amount of saturated vapor which results from the temperature changes. Due to the above-mentioned function, the inside of the space in which the coil springs 34, 35, 36 are accommodated is kept in a dried state.

Within a range of the whole disclosure (including a scope of the claims, and the drawings) and on the basis of the basic technical ideas thereof, the aforementioned embodiments may be changed and/or adjusted. In addition, within a range of the scope of the claims, various combinations and/or selections of each element disclosed is possible. That is, this disclosure includes various changes and modifications that one skilled in the art will achieve in accordance with the whole disclosure including the scope of the claims, the drawings, and the technical idea.

According to the embodiments, the torque fluctuation absorber 3 includes the center plate 23 rotatably arranged, the side plate 17, 18 arranged coaxially with and rotatably relative to the center plate 23, the outer coil spring 34 and the inner coil spring 35 each accommodated in the space surrounded by the side plate 17, 18 and absorbing the torque fluctuations generated between the side plate 17, 18 and the center plate 23, the cover member 25 separating the space and the outside space from each other by covering the clearance between the center plate 23 and the side plate 17, and the vent portion 17e, the hole portion 17b, or the water-resistant moisture-permeable material 60 arranged inwardly in the radial direction of the side plate 17, 18 relative to the cover member 25 and providing the ventilation between the space and the outside space.

According to the above described structure, the vent portion 17e, the hole portion 17b or the water-resistant moisture-permeable material 60 is provided between the space in which the outer coil spring 34 and the inner coil spring 35 are accommodated and the outside space, and thus the thermal expansion (or the thermal contraction) of the internal gas caused by the temperature change is released, which restricts the difference in pressure from occurring between the inside and the outside relative to the cover member 25. Accordingly, the suction of, for example, the muddy water and/or the leakage of, for example, the grease may be restricted. In addition, by providing the vent portion 17e, the hole portion 17b or the water-resistant moisture-permeable material 60 at the radially inner side, the suction of, for example, the muddy water from the vent portion 17e, the hole portion 17b or the water-resistant moisture-permeable material 60 may be restricted.

According to the embodiments, the cover member 25 is in close contact with and is fixed to one of the center plate 23 and the side plate 18 continuously in the circumferential direction of the side plate 18, and the cover member 25 is slidably in pressure contact with the other one of the center plate 23 and the side plate 18 continuously in the circumferential direction.

According to the embodiments, the vent portion 17e, the hole portion 17b or the water-resistant moisture-permeable material 60 is arranged inwardly in the radial direction of the side plate 17 relative to the portion at which the cover member 25 and the side plate 18 is in pressure contact with each other.

According to the embodiments, the side plate 17 includes the cylindrical portion 17c arranged inwardly in the radial direction of the side plate 17 relative to the center plate 23 and the center plate 23 is rotatably supported by the outer peripheral surface of the cylindrical portion 17c via the bearing 28.

According to the embodiments, any one of the center plate 23, the bearing 28 and the side plate 17 includes the vent portion 17e formed in the shape corresponding to the outer shape of the bearing 28 and providing the ventilation between the space surrounded by the side plate and the outside space.

According to the embodiments, the vent portion 17e is the groove portion or the recessed portion provided at the outer peripheral surface of the cylindrical portion 17c of the side plate 17 or at the inner peripheral surface of the bearing 28.

According to the embodiments, the bearing 28 separates the space surrounded by the side plate 17, 18 and the outside space from each other.

According to the embodiments, the opening portion of the vent portion 17e faces outwardly in the radial direction of the side plate 17.

According to the embodiments, the intermediate portion of the vent portion 17e includes the portion formed to be in parallel with the axial direction of the side plate 17.

According to the embodiments, the vent portion 17b, 60 includes the hole portion 17b provided at the side plate 17 and the water-resistant moisture-permeable material 60 closing the hole portion 17b.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:
1. A torque fluctuation absorber, comprising:
a center plate rotatably arranged;
a side plate arranged coaxially with and rotatably relative to the center plate;
an elastic member accommodated in a space surrounded by the side plate, and absorbing torque fluctuations generated between the side plate and the center plate;

a cover member separating the space and an outside space from each other by covering a clearance between the center plate and the side plate;
a vent portion arranged inwardly in a radial direction of the side plate relative to the cover member and providing ventilation between the space and the outside space;
wherein the side plate includes a cylindrical portion arranged inwardly in the radial direction of the side plate relative to the center plate, the center plate being rotatably supported by the cylindrical portion via a bearing;
wherein the space is continuous and is defined by the center plate, the side plate, the cover member, and the bearing;
wherein the vent portion includes a groove portion provided at part of any one of an outer peripheral surface of the cylindrical portion and an inner peripheral surface of the bearing; and
wherein the cylindrical portion and the bearing, other than the groove portion, are in contact with each other and the cylindrical portion is fixed to the bearing.

2. The torque fluctuation absorber according to claim 1, wherein the cover member is in close contact with and is fixed to one of the center plate and the side plate continuously in a circumferential direction of the side plate, and the cover member is slidably in pressure contact with the other one of the center plate and the side plate continuously in the circumferential direction.

3. The torque fluctuation absorber according to claim 2, wherein the vent portion is arranged inwardly in the radial direction of the side plate relative to a portion at which the cover member and the side plate are in pressure contact with each other.

4. The torque fluctuation absorber according to claim 1, wherein any one of the center plate, the bearing and the side plate includes the vent portion formed in a shape corresponding to an outer shape of the bearing and providing the ventilation between the space surrounded by the side plate and the outside space.

5. The torque fluctuation absorber according to claim 4, wherein the vent portion is provided at the outer peripheral surface of the cylindrical portion of the side plate.

6. The torque fluctuation absorber according to claim 5, wherein the bearing separates the space surrounded by the side plate and the outside space from each other.

7. The torque fluctuation absorber according to claim 6, wherein an opening portion of the vent portion faces outwardly in the radial direction of the side plate.

8. The torque fluctuation absorber according to claim 7, wherein an intermediate portion of the vent portion includes a portion formed to be in parallel with an axial direction of the side plate.

9. The torque fluctuation absorber according to claim 1, wherein the vent portion includes a hole portion provided at the side plate and a water-resistant moisture-permeable material closing the hole portion.

10. A torque fluctuation absorber, comprising:
a rotatable center plate;
a side plate coaxial with the center plate and rotatable relative to the center plate, the side plate surrounding a space, the side plate being arranged relative to the center plate so that a clearance exists between the side plate and the center plate;
an elastic member which absorbs torque fluctuations generated between the side plate and the center plate, the elastic member being accommodated in the space surrounded by the side plate;
a cover member covering the clearance between the center plate and the side plate to separate the space from an outside space which is outside the space accommodating the elastic member;
a vent portion providing ventilation between the space and the outside space, the vent portion being positioned radially inwardly of the side plate relative to the cover member;
the side plate including a cylindrical portion at a radially inward portion of the side plate, the cylindrical portion possessing an outer surface at which is located a groove portion constituting at least a part of the vent portion;
a bearing positioned in the groove portion and rotatably supporting the center plate, the cylindrical portion including upstanding walls at opposite ends of the groove portion that face opposite axial ends of the bearing;
the space being continuous and defined by the center plate, the side plate, the cover member, and the bearing; and
the cylindrical portion is fixed to the bearing.

11. The torque fluctuation absorber according to claim 10, wherein the cover member is in close contact with and is fixed to one of the center plate and the side plate continuously in a circumferential direction of the side plate, and the cover member is slidably in pressure contact with the other one of the center plate and the side plate continuously in the circumferential direction.

12. The torque fluctuation absorber according to claim 11, wherein the vent portion is arranged inwardly in the radial direction of the side plate relative to a portion at which the cover member and the side plate are in pressure contact with each other.

13. The torque fluctuation absorber according to claim 10, wherein the vent portion is provided in one of the center plate, the bearing and the side plate, the vent portion possessing a shape corresponding to an outer shape of the bearing and providing the ventilation between the space surrounded by the side plate and the outside space.

14. The torque fluctuation absorber according to claim 13, wherein the bearing separates the outside space and the space surrounded by the side plate from each other.

15. The torque fluctuation absorber according to claim 14, wherein the vent portion includes an opening portion facing outwardly in the radial direction of the side plate.

16. The torque fluctuation absorber according to claim 15, wherein an intermediate portion of the vent portion includes a portion parallel with an axial direction of the side plate.

17. The torque fluctuation absorber according to claim 10, wherein the vent portion includes a hole portion provided at the side plate and a water-resistant moisture-permeable material closing the hole portion.

* * * * *